(12) United States Patent
Mavureddi Dhanasekaran (10) Patent No.: US 12,470,917 B2
(45) Date of Patent: Nov. 11, 2025

(54) REGISTERING A USER EQUIPMENT TO A COMMUNICATION NETWORK

(71) Applicant: Nokia Technologies Oy, Espoo (FI)

(72) Inventor: Ranganathan Mavureddi Dhanasekaran, Munich (DE)

(73) Assignee: Nokia Technologies Oy, Espoo (FI)

( * ) Notice: Subject to any disclaimer, the term of this patent is extended or adjusted under 35 U.S.C. 154(b) by 301 days.

(21) Appl. No.: 18/177,260

(22) Filed: Mar. 2, 2023

(65) Prior Publication Data

US 2023/0292115 A1 Sep. 14, 2023

(30) Foreign Application Priority Data

Mar. 11, 2022 (FI) .................................. 20225217

(51) Int. Cl.
| | |
|---|---|
| *H04L 29/06* | (2006.01) |
| *H04W 8/18* | (2009.01) |
| *H04W 12/041* | (2021.01) |
| *H04W 12/72* | (2021.01) |
| *H04W 60/00* | (2009.01) |

(52) U.S. Cl.
CPC ........... *H04W 12/041* (2021.01); *H04W 8/18* (2013.01); *H04W 12/72* (2021.01); *H04W 60/00* (2013.01)

(58) Field of Classification Search
CPC ...... H04L 63/06; H04L 63/08; H04W 12/041; H04W 12/72; H04W 8/18; H04W 60/00
See application file for complete search history.

(56) References Cited

U.S. PATENT DOCUMENTS

| | | | |
|---|---|---|---|
| 2020/0007320 A1* | 1/2020 | Xu | ........................ H04L 9/0894 |
| 2021/0409934 A1 | 12/2021 | Tiwari et al. | |
| 2022/0038896 A1 | 2/2022 | Nair et al. | |
| 2022/0070664 A1* | 3/2022 | Stojanovski | ........ H04W 12/122 |
| 2023/0370840 A1* | 11/2023 | Rajadurai | ......... H04W 12/0433 |

FOREIGN PATENT DOCUMENTS

| | | |
|---|---|---|
| CN | 114079924 A | 2/2022 |
| EP | 3890382 A1 | 10/2021 |

OTHER PUBLICATIONS

Extended European Search Report received for corresponding European Patent Application No. 23159579.4, dated Jul. 11, 2023, 10 pages.
Malina et al., "Secure and efficient two-factor zero knowledge authentication solution for access control systems", Computers & Security, vol. 77, Aug. 2018, pp. 500-513.

(Continued)

*Primary Examiner* — Joseph P Hirl
*Assistant Examiner* — Chi D Nguy
(74) *Attorney, Agent, or Firm* — Laine IP Oy (57) ABSTRACT

There is provided an apparatus for a communication network comprising means for generating a subscription concealed identifier, SUCI, comprising a protection scheme identifier and a home network public key identifier. At least one of: a part of the protection scheme identifier and a part of the home network public key identifier comprises a version number of the at least one of: the protection scheme identifier and the home network public key identifier, correspondingly.

11 Claims, 5 Drawing Sheets

---

| Generating a SUCI. | 600 |
|---|---|
| Sending a registration request including the SUCI. | 601 |
| Receiving a registration reject including a cause. | 602 |
| Generating another SUCI based on a default configuration. | 603 |
| Sending a registration request including the another SUCI. | 604 |
| Receiving a registration accepted. | 605 |

(56) References Cited

OTHER PUBLICATIONS

"3rd Generation Partnership Project; Technical Specification Group Services and System Aspects; Security architecture and procedures for 5G system (Release 17)", 3GPP TS 33.501, V17.4.1, Jan. 2022, pp. 1-287.

"3rd Generation Partnership Project; Technical Specification Group Core Network and Terminals; Characteristics of the Universal Subscriber Identity Module (USIM) application (Release 17)", 3GPP TS 31.102, V17.2.0, Jun. 2021, pp. 1-328.

"3rd Generation Partnership Project; Technical Specification Group Core Network and Terminals; Non-Access-Stratum (NAS) protocol for 5G System (5GS); Stage 3; (Release 17)", 3GPP TS 24.501, V17.3.1, Jun. 2021, pp. 1-825.

"LS for clarification on managing expired or multiple Protection Scheme and Home Network keys used for SUCI calculation", 3GPP TSG-CT WG6 Meeting #106e, C6-210180, Agenda item: TEI17, CT6, May 25-28, 2021, 1 page.

"3rd Generation Partnership Project; Technical Specification Group Services and System Aspects; System architecture for the 5G System (5GS); Stage 2 (Release 17)", 3GPP TS 23.501, V17.3.0, Dec. 2021, pp. 1-559.

"IEEE 802.11", Wikipedia, Retrieved on Mar. 24, 2023, Webpage available at : https://en.wikipedia.org/wiki/IEEE_802.11.

"3rd Generation Partnership Project; Technical Specification Group Services and System Aspects; Policy and charging control framework for the 5G System (5GS); Stage 2 (Release 17)", 3GPP TS 23.503, V17.3.0, Dec. 2021, pp. 1-144.

"3rd Generation Partnership Project; Technical Specification Group Core Network and Terminals; Numbering, addressing and identification; (Release 17)", 3GPP TS 23.003, V17.4.0, Dec. 2021, pp. 1-146.

Aboba et al., "The Network Access Identifier", RFC 4282, Network Working Group, Dec. 2005, pp. 1-16.

Office action received for corresponding Finnish Patent Application No. 20225217, dated Aug. 12, 2022, 12 pages.

Liu et al., "Security Enhancements to Subscriber Privacy Protection Scheme in 5G Systems", International Wireless Communications and Mobile Computing (IWCMC), Jun. 28-Jul. 2, 2021, pp. 451-456.

"3rd Generation Partnership Project; Technical Specification Group Services and System Aspects; Security architecture and procedures for 5G system (Release 17)", 3GPP TS 33.501, V17.4.2, Jan. 2022, pp. 1-287.

"3rd Generation Partnership Project; Technical Specification Group Services and System Aspects; Study on authentication enhancements in the 5G System (5GS); (Release 17)", 3GPP TR 33.846, V17.0.0 , Dec. 2021, pp. 1-64.

Office action received for corresponding Finnish Patent Application No. 20225217, dated Dec. 15, 2022, 9 pages.

\* cited by examiner

REGISTERING A USER EQUIPMENT TO A COMMUNICATION NETWORK

FIELD

Various example embodiments relate to registering a user equipment to a communication network, and a method and computer means for implementing such.

BACKGROUND

When a user equipment, UE, gains access to a network, the network and the UE may mutually authenticate. An access authentication or a primary authentication is a security procedure in communication networks, like in networks according to specifications of $3^{rd}$ Generation Partnership Project, 3GPP. The UE may be authenticated based on a shared symmetric key, which is based on a subscriber identification of the UE. The network is configured to provide connectivity to the device based on the result of the authentication and authorization.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a first aspect, there is provided an apparatus for a communication network comprising: means for generating a subscription concealed identifier, SUCI, comprising a protection scheme identifier and a home network public key identifier, wherein at least one of: a part of the protection scheme identifier and a part of the home network public key identifier comprises a version indication of at least one of the protection scheme identifier and the home network public key identifier.

According to a second aspect, there is provided a method comprising generating a subscription concealed identifier, SUCI, wherein the SUCI comprises a protection scheme identifier and a home network public key identifier, and wherein at least one of: a part of the protection scheme identifier and a part of the home network public key identifier comprises a version indication of the at least one of the protection scheme identifier and the home network public key identifier.

According to a third aspect, there is provided a (non-transitory) computer readable medium comprising program instructions that, when executed by at least one processor, cause an apparatus at least: to generate a subscription concealed identifier, SUCI, wherein the SUCI comprises a protection scheme identifier and a home network public key identifier, and wherein at least one of the protection scheme identifier and the home network public key identifier comprises a version indication of the protection scheme identifier and the home network public key identifier.

According to a fourth aspect, there is provided an apparatus for a network function comprising: means for receiving a registration request including a subscription concealed identifier, SUCI, wherein the SUCI comprises a protection scheme identifier and a home network public key identifier, and wherein at least one of: a part of the protection scheme identifier and a part of the home network public key identifier comprises a version indication of the same, and means for detecting the version indication of at least one of: the protection scheme identifier and the home network public key identifier from the SUCI received with the registration request.

According to a fifth aspect, there is provided a method for a network function comprising: receiving a registration request including a subscription concealed identifier, SUCI, wherein the SUCI comprises a protection scheme identifier and a home network public key identifier, and wherein at least one of: a part of the protection scheme identifier and a part of the home network public key identifier comprises a version indication of the same; and means for detecting the version indication of at least one of: the protection scheme identifier and the home network public key identifier from the SUCI received with the registration request.

According to a sixth aspect, there is provided a computer program configured to cause a method in accordance with the second aspect or with the fifth aspect to be performed.

According to a seventh aspect, there is provided a data structure comprising at least one of: a protection scheme identifier and a home network public key identifier, wherein at least one of a part of the protection scheme identifier and a part of the home network public key identifier comprises a version indication of the protection scheme identifier and the home network public key identifier. The data structure may be a data structure for a communication network. The data structure may be exchanged between entities of the communication network.

Any Figures that may not strictly fall under the scope of protection are used for illustration of relevant technology in order to better understand the technical context and background.

DETAILED DESCRIPTION

A UE is configured to generate a subscription concealed identifier, SUCI, using a protection scheme with a public key of a home network, HN, that has been securely provisioned to the subscriber identifier, like USIM during USIM registration. There is provided a mechanism, which enables managing expired, updated or multiple protection scheme and HN keys, which are used for SUCI calculation. A part of the home network public key identifier and/or the protection scheme identifier are used for indicating a version of the currently used HN keys and protection scheme. The version indication of the HN keys and protection scheme that were used for SUCI calculation, is sent to the network with a registration request. This enables detection of the currently used version at the network side. In case an old or invalidated version is used for SUCI calculation, the network rejects the registration request without de-concealing the SUCI. The network may inform the registration reject to the registering entity using a cause value. In addition, a default version including default configurations may be introduced for the home network public key identifier and protection scheme identifier. The default configurations enable registering a USIM even if it lacks updates or the currently valid versions of the home network public key identifier and protection scheme identifier.

Figure 1:
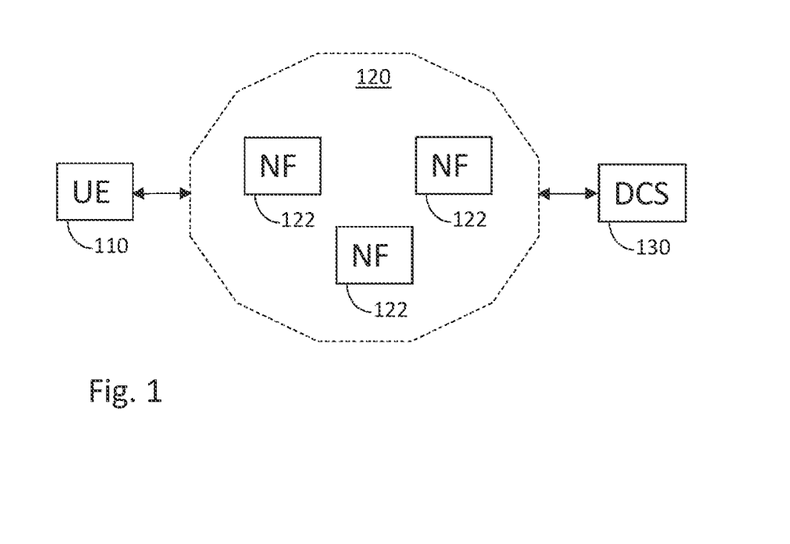
FIG. 1 shows, by way of example, a system in accordance with at least some embodiments.

FIG. 1 shows, by way of example, a system in accordance with at least some embodiments. The system comprises a user equipment, UE, 110 and a communication network 120. The communication network 120 may be referred to as an onboarding network, to which the UE 110 may desire to access. The communication network 120 may be a public land mobile network, PLMN, or a non-public network, NPN, for example as defined in 3GPP standardization specification TS23.501. A NPN may be a standalone NPN, SNPN, or Public Network Integrated NPN, PNI-NPN. The communication network 120 may be a non-3GPP network, for example a cable network, a network based on a wireless network protocols based on IEEE 802.11, Wi-Fi, or a Wireless Local Area Network, WLAN.

In FIG. 1 a user equipment, UE, 110 comprises a mobile equipment and a user service identity module. A user equipment may include, but is not limited to, a smartphone, a cellular phone, a laptop computer, a tablet computer, a machine-to-machine node, M2M node, a machine-type-communication node, MTC node, a massive machine-type-communication node, mMTC node, an internet-of-things node, IoT node, a car telemetry unit, or any terminal or entity enabling wireless communication or access to a wireless network.

In FIG. 1 the communication network 120 is equipped with one or more network functions, NF, 122. A network function may refer to an operational and/or a physical entity. A network function may be a specific network node or element, or a specific function or set of functions carried out by one or more entities, such as virtualized network elements, VNFs. One physical node may be configured to perform plural NFs. Examples of such network functions include a resource control or management function, session management or control function, interworking, data management or storage function, authentication function or a combination of two or more of these functions.

In case of a third generation partnership project, 3GPP, fifth generation, 5G, system service based architecture, SBA, core network, NFs may comprise at least some of an access and mobility management function, AMF, a session management function, SMF, a network slice selection function, NSSF, a network exposure function, NEF, a network repository function, NRF, a unified data management, UDM, a unified data repository, UDR, an authentication server function, AUSF, a policy control function, PCF, and an application function, AF. A NEF is configured to provide access to exposed network services and capabilities. A UDM is configured to manage network user data in a single, centralized element. A UDR facilitates sharing and provisioning of user-related data throughout services of a 3GPP system. The communication network 120 may further comprise a security edge protection proxy, SEPP, configured to operate as a security edge node or gateway. The NFs may communicate with each other using representational state transfer, REST, application programming interfaces, for example. These may be known as RESTful APIs. Further examples of NFs include NFs related to gaming, streaming or industrial process control. The system may comprise also nodes from 3G or 4G node systems, such as home subscriber server, HSS, and a suitable interworking function for protocol translations between e.g. Diameter and JSON-based RESTful APIs. While described herein primarily using terminology of 5G systems, the principles as described herein are applicable also to other communication networks, such as 4G networks and non-3GPP networks, for example.

While the example of FIG. 1 has one communication network, 120, two or more networks may be present. In case of multi-networks, in FIG. 1, the SEPP is a network node at the boundary of an operator's network that may be configured to receive a message, such as a Hypertext Transfer Protocol, HTTP, request or HTTP response from an NF, to apply protection for sending and to forward the thus reformatted message through a chain of intermediate nodes, such as IP eXchanges, IPX, towards a receiving SEPP. The receiving SEPP receives a message sent by the sending SEPP and forwards the message towards an NF within its operator's network, e.g. the AUSF.

A non-3GPP access, for example a WLAN access may be arranged via non-3GPP interworking function, N3IWF. A N3IWF is configured to provide an access point to the 5G core network outside the 5G radio access network, RAN. A N3IWF is configured to route messages outside the 5G RAN, of non-3GPP networks, over Internet Protocol, IP, security tunnels. The AMF of the 5G core network is configured to implement non-access-stratum, NAS, security, e.g. ciphering and integrity protection algorithms.

A UDM is configured to host functions related to data management, such as an authentication credential repository and processing function, ARPF, which is configured to select an authentication method based on a subscriber identity and configured policy. In 5G each subscriber is allocated a subscription permanent identifier, SUPI. A SUPI is defined according to 3GPP specification TS23.501. A SUPI may be concealed to form a corresponding subscriber concealed identifier, SUCI. An elliptic curve integrated encryption scheme, ECIES, may be employed. A SUCI may be transmitted in 5G networks from one entity to another. A subscription identifier de-concealing function, SIDF, is configured to decrypt a SUCI to obtain a SUPI. The subscription permanent identifier may be formatted in accordance with network access identifier, NAI, format or international mobile subscriber identifier, IMSI, format. The subscription permanent identifier may be transmitted in an encrypted form. For example, a public key based encryption may be used to protect the SUPI. The SIDF may have access to the private key associated with the public key distributed to the UE for encrypting the SUPI. 5G authentication is configured to support both 3GPP and non-3GPP access networks, such as Wi-Fi or cable networks.

A default credential server, DCS, 130, may refer to a node or an entity, which is able to authenticate a UE with default UE credentials. A DCS, 130, may be configured to enable another entity to authenticate a UE with default UE credentials. A DCS is located in a network, which is different from the onboarding network, to which the UE is onboarding. The DCS 130 may be configured to be part of a visited home network of the UE 110 or to be part of a standalone network. The DCS 130 maybe comprised in a home network or in a standalone network. A secure channel may be established between the UE and the DCS. In 4G a home network may comprise a home subscriber server, HSS, which is configured to store user credentials and authenticate users. The DCS, which may be at the home network or at a standalone network, may be configured to store user credentials and authenticate the IE instead of the HSS. In 5G a security anchor function, SEAF, is configured to serve as a middleman between a UE and the DCS during authentication process. A SEAF is configured to rely on the DCS of the UE to accept the authentication, which it may reject.

Air interfaces may be configured in accordance with a cellular radio access technology. Cellular radio access technology may comprise, for example, Long Term Evolution, LTE, a fifth generation, 5G, radio access technology, which may be called a New Radio, NR, or MulteFire. However, embodiments and examples described herein are not limited to any specific cellular communication technology or standard, but may be exploited in any network. The UE, 110, and the DCS, 130, may be configured to communicate wirelessly via a radio access node, like a base station, of the communication network, 120. Wireless communication may be implemented in accordance with at least one standard defined by the $3^{rd}$ Generation Partnership Project, 3GPP, such as a 3GPP 5G NR RAN, or with a non-cellular radio access network IEEE 802.11 based wireless local area network, like WLAN.

A user equipment, UE, comprises a mobile equipment, ME and a user identity module. The user identity module may comprise a subscriber identifier, a subscriber identity module, SIM, a universal subscriber identity module, USIM, or any corresponding subscriber identifier, for example an executable or a programmable identifier. A user identity module enables subscriber identification, for example for authentication between the UE and a network. A subscriber permanent identifier, SUPI, is provisioned in a subscriber identifier of a UE and a UDM/UDR function in 5G core network. A SUPI may be formatted according to international mobile subscriber identifier, IMSI, according to TS23.503 for 3GPP radio access technology, RAT, or according to network access identifier, NAI, according to RFC 4282 based user identification according to in TS23.003 for non-3GPP RAT. IMSI format comprises a mobile country code, MCC, a mobile network code, MNC, and a mobile subscriber identification number, MSIN. NAI format comprises a subscriber part and a realm part in form of subscriber@realm. A subscriber part may refer to the subscriber identification part of the NAI format or the IMSI format. The realm part may refer to domain part of the NAI format, or to the corresponding fields including area information, like MCC and MNC, in the IMSI format. A UE is configured to generate concealed SUPI, called SUCI, comprising concealing the subscriber part or MSIN part of the SUPI. Concealing comprises using a protection scheme with a public key of a home network that has been securely provisioned to the subscriber identifier, like USIM during USIM registration.

Figure 2:
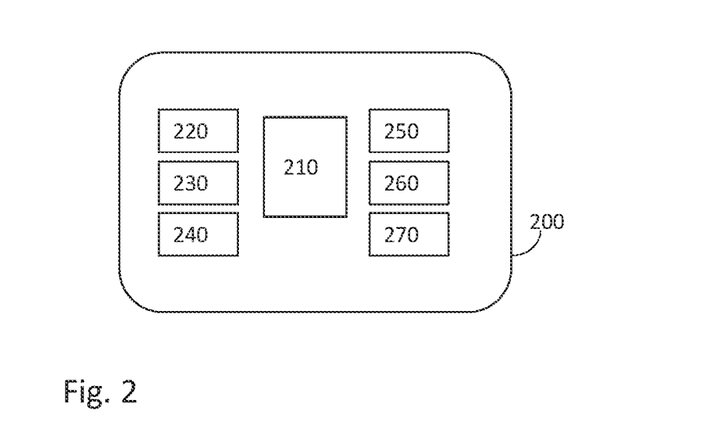
FIG. 2 shows, by way of example, a block diagram of an apparatus capable of supporting at least some embodiments.

FIG. 2 shows, by way of example, an apparatus capable of supporting at least some embodiments. Illustrated is a device 200, which may comprise, for example, a mobile communication device such as a UE 110 of FIG. 1, an NF such as 122 of FIG. 1, a DCS node or entity, such as 130 of FIG. 1. Comprised in device 200 is a processor 210, which may comprise, for example, a single- or multi-core processor wherein a single-core processor comprises one processing core and a multi-core processor comprises more than one processing core. The processor 210 may comprise, in general, a control device. The processor 210 may comprise more than one processor cores. The processor 210 may be a control device. A processing core may comprise, for example, a Cortex-A8 processing core manufactured by ARM Holdings or a Steamroller processing core designed by Advanced Micro Devices Corporation. The processor 210 may comprise at least one Qualcomm Snapdragon and/or Intel Atom processor. The processor 210 may comprise at least one application-specific integrated circuit, ASIC. The processor 210 may comprise at least one field-programmable gate array, FPGA. The processor 210 may be means for performing method steps in the device 200. The processor 210 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The device 200 may comprise a memory 220. The memory 220 may comprise random-access memory and/or permanent memory. The memory 220 may comprise at least one RAM chip. The memory 220 may comprise solid-state, magnetic, optical and/or holographic memory, for example. The memory 220 may be at least in part accessible to processor 210. The memory 220 may be at least in part comprised in processor 210. The memory 220 may be means for storing information. The memory 220 may comprise computer instructions that the processor 210 is configured to execute. When computer instructions configured to cause the processor 210 to perform certain actions are stored in the memory 220, and the device 200 overall is configured to run under the direction of the processor 210 using computer instructions from the memory 220, processor 210 and/or its at least one processing core may be considered to be configured to perform said certain actions. The memory 220 may be at least in part external to device 200 but accessible to device 200.

The device 200 may comprise a transmitter 230. The device 200 may comprise a receiver 240. The transmitter 230 and the receiver 240 may be configured to transmit and receive, respectively, information in accordance with at least one cellular or non-cellular standard. The transmitter 230 may comprise more than one transmitter unit. The receiver 240 may comprise more than one receiver unit. The transmitter 230 and/or the receiver 240 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

The device 200 may comprise a near-field communication, NFC, transceiver 250. The NFC transceiver 250 may support at least one NFC technology, such as NFC, Bluetooth, Wibree or similar technologies.

The device 200 may comprise a user interface, UI, 260. The UI 260 may comprise at least one of a display, a keyboard, a touchscreen, a vibrator arranged to signal to a user by causing device 200 to vibrate, a speaker and a microphone. A user may be able to operate device 200 via the UI 260, for example to accept incoming telephone calls, to originate telephone calls or video calls, to browse the Internet, to manage digital files stored in memory 220 or on a cloud accessible via transmitter 230 and receiver 240, or via NFC transceiver 250, and/or to play games.

The device 200 may comprise or be arranged to accept a user identity module 270. User identity module 270 may comprise, for example, a subscriber identity module, SIM, card installable in device 200. A user identity module 270 may comprise information identifying a subscription of a user of device 200. A user identity module 270 may comprise cryptographic information usable to verify the identity of a user of device 200 and/or to facilitate encryption of communicated information and billing of the user of device 200 for communication effected via the device 200.

Processor 210 may be furnished with a transmitter arranged to output information from processor 210, via electrical leads internal to the device 200, to other devices comprised in the device 200. Such a transmitter may comprise a serial bus transmitter arranged to, for example, output information via at least one electrical lead to memory 220 for storage therein. Alternatively to a serial bus, the transmitter may comprise a parallel bus transmitter. Likewise processor 210 may comprise a receiver arranged to receive information in processor 210, via electrical leads internal to device 300, from other devices comprised in device 200. Such a receiver may comprise a serial bus receiver arranged to, for example, receive information via at least one electrical lead from receiver 240 for processing in processor 210. Alternatively to a serial bus, the receiver may comprise a parallel bus receiver.

The device 200 may comprise further devices not illustrated in FIG. 2. For example, where device 200 comprises a smartphone, it may comprise at least one digital camera. Some devices 200 may comprise a back-facing camera and a front-facing camera, wherein the back-facing camera may be intended for digital photography and the front-facing camera for video telephony. Device 200 may comprise a fingerprint sensor arranged to authenticate, at least in part, a user of device 200. In some example embodiments, device 200 lacks at least one device described above. For example, some devices 200 may lack a NFC transceiver 250 and/or user identity module 270.

A processor 210, a memory 220, a transmitter 230, a receiver 240, an NFC transceiver 250, a UI 260 and/or a user identity module 270 may be interconnected by electrical leads internal to device 200 in a multitude of different ways. For example, each of the aforementioned devices may be separately connected to a master bus internal to device 200, to allow for the devices to exchange information. However, as the skilled person will appreciate, this is only one example and depending on the embodiment various ways of interconnecting at least two of the aforementioned devices may be selected.

In communication networks or systems, a network operator may allocate to each user identity module a unique identifier. The unique identifier is known as International Mobile Subscriber Identity, IMSI, up to 4G, and a Subscription Permanent Identifier, SUPI, starting from 5G. A SUPI may comprise an International Mobile Subscriber Identifier, IMSI, as defined in TS23.503 for 3GPP Radio Access Technology, RAT; or a Network Access Identifier, NAI, as defined in RFC (request for comments) 4282 based user identification as defined in TS23.003 for non-3GPP RAT. A SUPI is usually a string of 15 decimal digits. A SUPI may be similar to an IMSI, which is a unique identifier string of 15 digits. A subscription concealed identifier, SUCI, is a privacy preserving identifier containing a concealed SUPI. The UE may generate a SUCI using an ECIES-based protection scheme with the public key of the home network, HN, that was securely provisioned to the USIM during the USIM registration. The MSIN part of the SUPI may be concealed by the protection scheme while the HN identifier, e.g. MCC/MCN, may be transmitted in plain text. The SUCI comprises data fields for SUPI type, HN identifier, routing indicator, protection scheme identifier, HN public key identifier and protection scheme output. Routing indicator, HN public key identifier and protection scheme identifier are shared in plain text between the UE and the UDM.

The subscriber identification mechanism, when a UE is configured to register to a HN, allows the identification of the UE on the over the air, OTA, radio interface by means of the SUCI. At initial phase of SUCI usage, the UE comprises a HN public key and the UDM comprises a HN private key. When the UE tries to register to a given network or to the HN, the UE is configured to encrypt a SUPI into a SUCI using the HN public key and to send an initial registration request including the SUCI. At the network side, an AMF forwards the SUCI via an AUSF to a UDM. The UDM is configured to de-conceal the SUCI using the HN private key into the SUPI and to return it to the AUSF. The AUSF is configured to reply with authentication response including the SUPI information. For SUCI concealment and de-concealment, HN public key identifier and protection scheme identifier are shared in plain text between the UE and the UDM. These identifiers may be updated by the UDM as over-the-air, OTA, update to the UE. It may be due to various reasons that an OTA update cannot be performed, for example for an extended period. As an example, a USIM, which is configured to store the HN public key, might have been removed from a device, like a UE, and thus unable to receive the HN public key via an OTA update, and/or to store the HN public key. As another example, a device, like the UE, may be located outside the coverage area of the HN. When OTA update is not received by a UE and at the network side, the previously used HN private key and the corresponding HN public key are invalidated, the UE may fail future attempts to register to the network using the previously used HN public key. As the UDM does not have access to the previous, invalidated HN private key or protection scheme, the SUCI de-concealment cannot be done. IMSI cannot be retrieved. The UE and its USIM may be left not reachable and not authenticated. In order to handle this kind of situations, home network public key identifier, HN PKI, which is used to indicate which public/private key pair is used for SUPI protection and de-concealment of the SUCI in accordance to TS 23.003, is further configured to include information on the currently used version of the HN PKI set.

The HN PKI set is configured to take into use the $8^{th}$ bit for at new, updated key set identifier, which is delivered from an UDM. Values 0-127 are used for HN PKI and corresponding HN public keys. When a new, updated patch of HN PKIs is delivered, the $8^{th}$ bit, b8, is set. At maximum 127 HN PKIs may be stored at a given point in time. If an operator decides or is configured to have HN public key updates often, both bits b7 and b8 may be used for the version indication. In this configuration maximum of 63 HN public keys can be maintained.

A version may be called a version indication or a version number. It enables version management of the protection scheme identifier and/or HN PKI. Version management enables detection of the used version, and indication of the version to be used.

If the protection scheme identifier data object length is not zero, then this data contains a list of protection scheme identifier and corresponding key index. The first protection scheme identifier entry has the highest priority and the last one has the lowest priority. The key index value indicates the position of the HN public key in the HN public key list, which is applicable to this protection scheme. The key index value indicates the position of the HN public key in the HN public key list data object, which is applicable for protection scheme. If the key index value is "1", then it refers to the first network public key entry in the HN public key list. If the key index value is "3", then it refers to the third network public key entry in HN public key list.

In addition to control of versions, a default configuration may be introduced. The operator may replace or update the protection schemes or HN public keys. The last or lower priority protection scheme may be set as a default configuration. The default configuration is not replaced by any newer update, but it remains constant. If a USIM of a UE missed the OTA update and utilizes the older, replaced protection scheme identifier or HN PKI for a SUCI generation, the UDM is configured to detect this by checking the bits b5-b8 of the protection scheme identifier or bits b7-b8 of the HN PKI. When the UDM detects that the SUCI cannot be de-concealed due to old version(s), the UDM is configured to inform the USIM. The UDM may be configured to inform the USIM that a default configuration is to be used instead of re-trying with other older, replaced protection scheme identifier or HN PKIs.

A cause value for indicating a reason for the registration reject may be introduced in order to aid the UDM to inform the USIM. A 5GMM cause value may be utilized. The 5G Mobility Management, 5GMM, protocol provides procedures for the control of mobility when the UE is using the NG-RAN and/or non-3GPP access network. The 5GMM signalling, being the Non-Access Stratum, NAS, signalling, takes place between the UE and the AMF. 5GMM has been described with the System architecture for the 5G Systems, 5GS, in 3GPP TS 24.501. The 5GMM cause value is used by the network to update USIM about potential issue with usage of older version of the protection scheme identifier and HN PKIs. Instead of older versions, the USIM, or the UE, may use the default configuration to generate the SUCI. After the authentication is successful, the OTA update is performed for the USIM.

Figure 3:
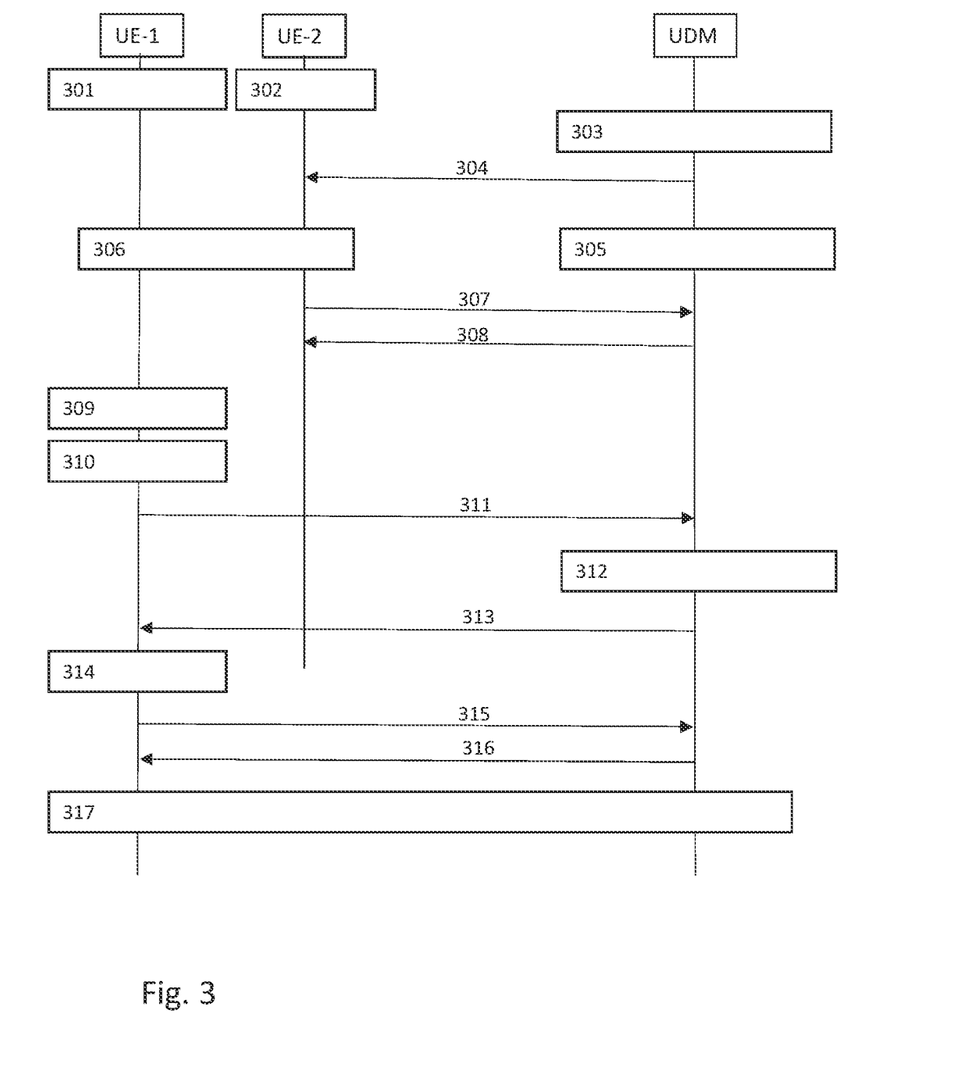
FIG. 3 shows, by way of example, signalling between a UE and network in accordance with at least some embodiments.

FIG. 3 illustrates, by way of an example, signalling between a UE and network. On the vertical axes are disposed, on the left, UE-1 and UE-2, and on the right, a UDM of the home network HN. Time advances from the top toward the bottom. The UE's, or the USIMs are authenticated with an existing HN public key set, which is called here HN public key set-W, which is initially configured by the operator of the HN. At 301 a UE-1 is out of network coverage. At 302 a UE-2 is under coverage area of the network. The operator may decide to update the existing HN public key set for all UEs. The HN is configured to introduce new protection keys that will eventually replace the existing ones. At 303 UDM is configured to update the existing HN public key set-W, and HN private key set-W, by overwriting those with an updated HN public- and HN private key set, which are called here HN public key set-Z and HN private key set-Z, correspondingly. At 304 an over the air, OTA, update is delivered from the UDM to all UEs or USIMs. Now, the $8^{th}$ bit, b8, of the HN public key identifier is set for the delivered updated HN public key set-Z. The delivered HN public key set-Z is configured to replace the existing HN public key set-W at a UE. Via OTA updates the operator of the HN is configured to dispatch the updated HN public key set-Z to all UEs, which are under coverage of the HN. In FIG. 3 UE-2 is configured to receive, via OTA update 304, the updated HN public key set-Z, and replace the existing HN public key set-W with it. An OTA update 304 may comprise dispatching multiple OTA updates. OTA updates may happen quite often on repeated intervals for a certain duration. After a certain duration of time, the OTA update is stopped. After the OTA update has been completed, at network side, at 305, the replaced HN public key set-W and the corresponding HN private key set-W are set as invalid. Correspondingly, the replaced HN public key set-W is set as invalid for UEs, devices and entities of the network, at 306.

The UE-2 has been at the coverage of the NW and received the updated HN public key set-Z, at 304. At 307, the UE-2 is able to send a registration request including a SUCI, which is generated based on the valid HN public key set-Z. The UDM is able to de-conceal or decrypt the SUCI into SUPI using the corresponding valid HN private key set-Z. At 308 the UDM sends an authentication response.

The UE-1 has been out of the coverage, and thus unable to receive OTA updates at 304. At 309, the UE-1 returns back at the coverage of the HN. The UE-1 has not received the updated HN public key set-Z, which should be used for calculating SUCI for the registration request. At 310, the UE-1 generates a SUCI based on the old HN public key set-W. At 311, a registration request including the SUCI, which is based on the old, already invalidated HN public key set-W, is sent from the UE-1 to the UDM. At 312, the UDM, before de-concealing the SUCI, is configured to check the bit b8 of the HN public key identifier, which is in plain text. The UDM is configured to detect that UE-1, or USIM of it, has used invalid HN public key. The UDM is configured, without de-concealing the SUCI, to send a registration reject to the UE-1 at 313. The registration reject is configured to include a cause value, which is configured to indicate a reason for the registration reject. The cause value may indicate the reason as invalidated or old version of a protection scheme identifier and/or a home network public key identifier. The registration reject may be sent with a 5GMM cause value. The UDM may be configured to send the cause value via network. For example, the UDM is configured to communicate the cause value to the AMF entity, and the AMF is configured to send the cause value to the UE/USIM. The cause value may be, for example "00111111", and correspond to "invalid HN public key or protection scheme".

At 314, the UE-1 receives the registration reject with the 5GMM cause value. The UE-1 is requested to generate a SUCI using a default configuration. The default configuration corresponds to the lowest priority protection scheme and corresponding HN public key 255. The SUCI may be generated by the USIM of the UE-1. In case mobile equipment, ME, of the UE-1 is configured to generate the SUCI, corresponding information for SUCI generation may be shared in elementary files, EF, to the ME of the UE-1 device from it's USIM. At 315, a registration request including the generated SUCI is sent to the UDM. The registration request including the SUCI generated using the default configuration may be retriggered by the USIM. The registration is accepted by the UDM. At 316, a registration accept is sent to the UE-1. At 317, after successful authentication, OTA update is performed and here the HN public key set-Z is sent to the UE-1.

In the previous signalling in case of updated HN key set is illustrated with FIG. 3. In the following, the same FIG. 3 is referred to for illustrating, by way of an example, signalling between a UE and network in case of an updated protection scheme. The UE's, or the USIMs, at a home network, HN, are authenticated with an existing HN public key sets using a protection scheme, which is called here protection scheme set-W, which is initially configured by the operator of the HN. At 301 a UE-1 is out of network coverage. At 302 a UE-2 is under coverage area of the network. The operator may decide to update the existing protection scheme, protection scheme set-W. The HN is configured to introduce a new protection scheme set or patch, called protection scheme set-Z that will eventually replace the existing one. At 303 UDM is configured to update the existing protection scheme set-W by overwriting it with the updated protection scheme set-Z. At 304 an over the air, OTA, update is delivered from the UDM to all UEs or USIMs at the coverage area of the NW. Now, the bits b5-b8 of the protection scheme are set for the delivered updated protection scheme set-Z. The delivered protection scheme set-Z is configured to replace the existing protection scheme set-W at a UE. Via OTA updates the operator of the HN is configured to dispatch the updated protection scheme set-Z to all UEs, which are under coverage of the HN. In FIG. 3 UE-2 is configured to receive, via OTA update 304, the updated protection scheme set-Z, and replace the existing protection scheme set-W with it. An OTA update 304 may comprise dispatching multiple OTA updates, at repeated intervals for a certain duration. After a certain duration of time, the OTA update is stopped. After the OTA update has been completed, at 305-306, the replaced protection scheme set-W is set as invalid at the network, for UEs, devices and entities of the network.

The UE-2 has been at the coverage of the NW and received the updated protection scheme set-Z, at 304. At 307, the UE-2 is able to send a registration request including a SUCI, which is generated based on the valid protection scheme set-Z. The UDM is able to de-conceal or decrypt the SUCI into SUPI using the valid protection scheme set-Z. At 308, the UDM sends an authentication response. The UE-2, or it's USIM, and the HN may be mutually authenticated.

The UE-1 has been out of the coverage, and thus unable to receive OTA updates at 304. At 309, the UE-1 returns back at the coverage of the HN. The UE-1 has not received the updated protection scheme set-Z, which should be used for calculating SUCI for the registration request. At 310, the UE-1 generates a SUCI based on the old protection scheme set-W. At 311, a registration request including the SUCI, which is based on the old, already invalidated protection scheme set-W, is sent from the UE-1 to the UDM. At 312, the UDM, before de-concealing the SUCI, is configured to check the bits b5-b8 of the protection scheme identifier, which is in plain text. The UDM is configured to detect that UE-1, or USIM of it, has used the older, previous protection scheme from the initial set or patch of protection scheme set-W. The protection scheme used by the UE-1 is invalid. The UDM is configured, without de-concealing the SUCI, to send a registration reject to the UE-1 at 313. The registration reject is sent with a 5GMM cause value. The UDM may be configured to send the cause value via network, for example to the AMF, which is configured to send the cause value to the UE/USIM. The cause may be, for example "00111111", and correspond to "invalid HN public key or protection scheme".

At 314, the UE-1 receives the registration reject with the 5GMM cause value. The UE-1 is requested to generate a SUCI using a default configuration. The default configuration corresponds to the lowest priority protection scheme and to the corresponding HN public key 255. The SUCI may be generated by the USIM of the UE-1. In case mobile equipment, ME, of the UE-1 is configured to generate the SUCI, corresponding information for SUCI generation may be shared in elementary files, EF, to the ME of the UE-1 device from it's USIM. At 315, a registration request including the generated SUCI is sent to the UDM. The registration request including the SUCI generated using the default configuration may be retriggered by the USIM. The registration is accepted by the UDM. At 316, a registration accept is sent to the UE-1. At 317, after successful authentication, OTA update is performed and here the protection scheme set-Z is sent to the UE-1.

Figure 4:
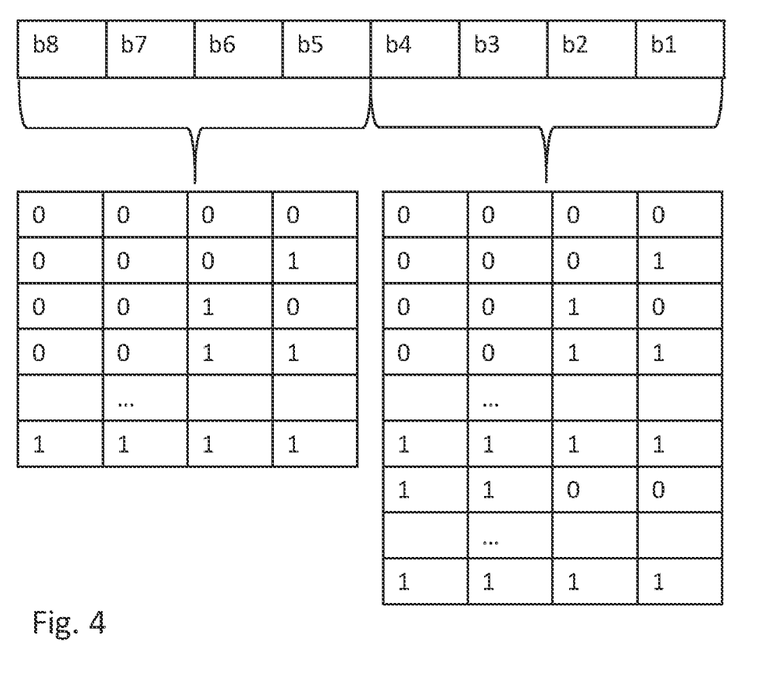
FIG. 4 shows, by way of example, a protection scheme identifier in accordance with at least some embodiments.

FIG. 4 shows, by way of example, a protection scheme identifier in accordance with at least some embodiments. Protection scheme identifier comprises 8 bits, b1-b8. The bits b1-b4 are used for a null scheme, an ECIES profile A and an ECIES profile B. In addition, a few bits may be reserved for future use. Values 1100-1111 of the bits b1-b4 are used for an operator specific protection scheme. Bits b5-b8 of the protection scheme have previously been unused and coded as zero. Now, the protection scheme identifier bits b5-b8 are utilized for indicating an updated version information of the protection scheme. Currently, the bits b5-b8 of previous, old or updated protection scheme identifiers are zero. When an UDM is configured to update and deliver new or updated protection scheme identifiers, the bits b5-b8 are set according to every new set or patch of the protection scheme identifiers. For example, "0000" value of bits b5-b8 represents initial configuration having no update of the protection scheme; "0001" value of bits b5-b8 represents that the first update of protection scheme is performed by the UDM; "0010" value of bits b5-b8 represents that the second update of protection scheme is performed by the UDM; and so on.

The bits b5-b8 of the protection scheme identifier are used to indicate the updated or upgraded version number of the protection scheme between the USIM and the UDM. Initially, the current existing version number is set as zero by default. When the operator updates new set of protection schemes, the version number is appended. The UDM performs the OTA update for the new set of protection schemes with the updated version number. For initial configurations of null scheme, the ECIES scheme profile A and the ECIES scheme profile B, the bits b5-b8 of the protection scheme identifier are zero, "0000". The protection scheme is treated as non-updated version.

When the UDM is configured to send two new, updated protection scheme identifier upgrades, this is considered as the first upgraded version. The newly appended protection scheme identifiers, as illustrated in bits b1-b4, are "0011" for an ECIES scheme profile D and "0100" for an ECIES scheme profile E. For the two new protection scheme upgrades, $5^{th}$ bit b5 is set to one and bits b6-b8 are set to zero. So, the upgraded version of the protection scheme identifier has bits b5-b8 values "0001", as illustrated in the FIG. 4. The following upgraded version shall have bits b5-b8 values "0010", and so on, until the $15^{th}$ upgraded version of the protection scheme identifiers having bits b5-b8 values "1111".

Figure 5:
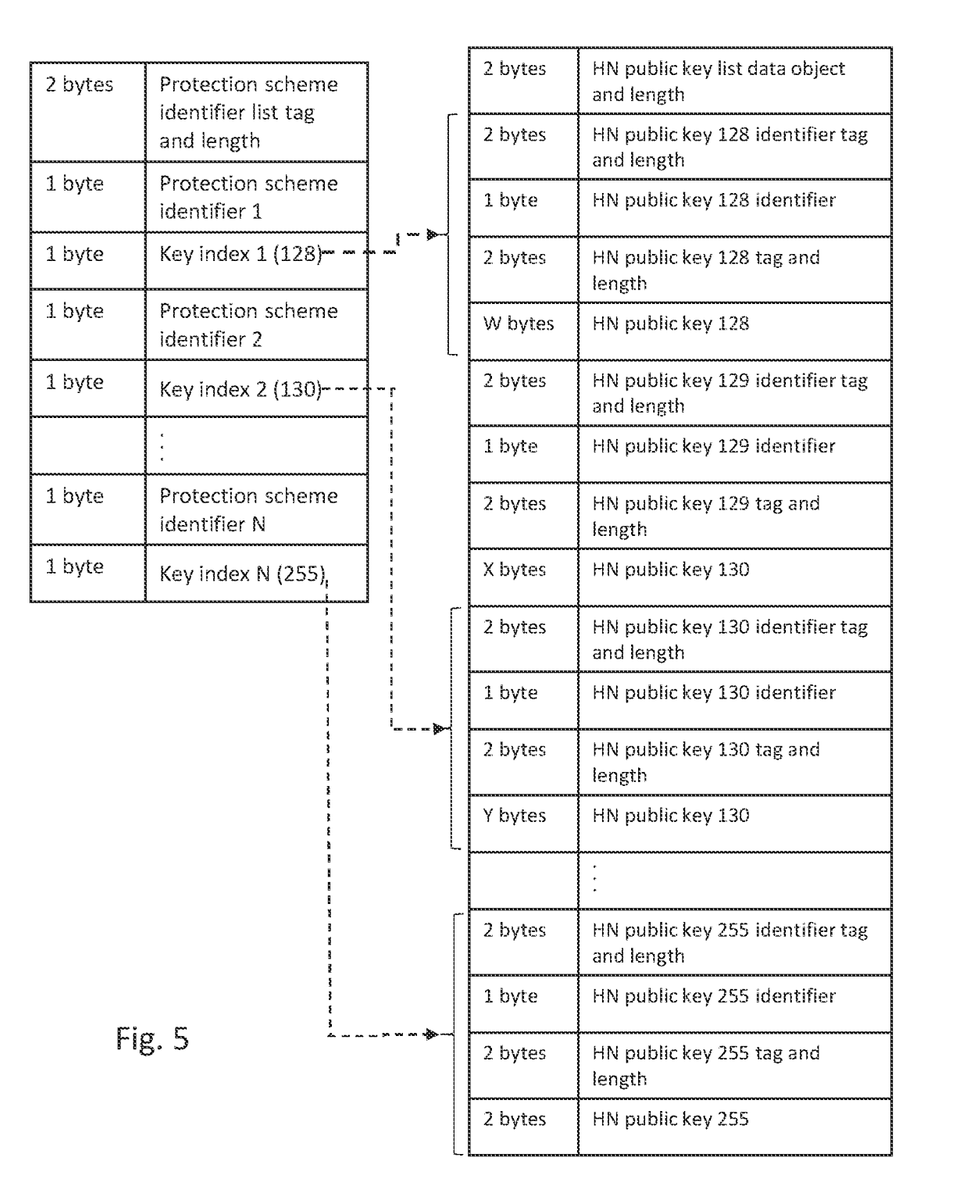
FIG. 5 shows, by way of example, a protection scheme table and a home network public key identifier table in accordance with at least some embodiments.

FIG. 5 shows, by way of example, a protection scheme table and a home network public key identifier table in accordance with at least some embodiments. The public key identifier, PKI, includes eight bits, b1-b8. The eighth bit, b8, of the PKI is used as a new key set identifier. A HN PKI can have values from 0 to 127, and corresponding HN public keys. If a new, upgraded HN PKIs are updated over the air, the b8 is set to "1". The value "1" of b8 indicates that values from 128 to 254 are used and the corresponding HN public keys are updated. Thus, it follows, that at a given point of time, maximum of 128 HN public key identifiers are stored. This includes both older and newer keys.

While HN may not expect to update the keys quite often, it is possible that the HN is expected to update the USIMs with more sets of HN public keys. In such case, using only b8 to indicate the update, may not be sufficient. It is possible to use two bits, b7 and b8, as an indication of new, updated public key set identifier from the UDM to USIMs. In such case, values 0-63 are available for HN PKI. Thus, at a given point of time, maximum of 64 public key identifiers are stored.

The HN PKI value 0 corresponds to bit b1-b8 values "00000000". The HN PKI values 1-127 correspond to bit b1-b8 values "00000001"-"01111111". The HN PKI value 128 correspond to bit b1-b8 values "10000000". The HN PKI values 129-254 correspond to bit b1-b8 values "10000001"-"11111110". The HN PKI value 255 corresponds to bit b1-b8 values "11111111". The HN PKI value 255 may be used as a default value for the HN PKI. The default HN PKI and the corresponding HN keys are not replaced by any newer or updated configurations received from the network. The default PKI is configured once and never replaced, but maintained as a constant, unchanged.

FIG. 5 illustrates a protection scheme table on the left side and HN PKI table on the right side. The protection scheme table includes a protection scheme identifier and corresponding key index for each of the protection scheme identifiers. The protections scheme identifier 1 is of the highest priority. The protection scheme identifier N is of the lowest priority.

The protection scheme identifier 1 is accompanied with the key index 1, which in this example is 128. The key index 1, being 128, is configured to point to the HN PKI table, to the HN public key 128 identifier tag and length, the HN public key 128 identifier, the HN public key 128 tag and length, the HN public key 128. Correspondingly, each protection scheme identifier key index at the left table is configured to point to the corresponding information (key number) at the HN PKI table on the right side. The lowest priority protection scheme key index N, which is 255 in FIG. 5, is configured to refer to the public key 255 information in the HN PKI table. The lowest priority protection scheme and the corresponding public key are used as a default configuration.

Figure 6:
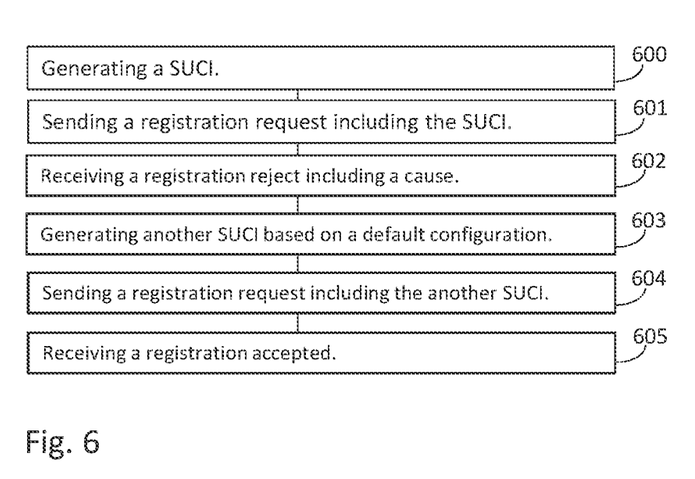
FIG. 6 shows, by way of example, a flow chart of a method for registering to a network using a SUCI.

An introduced 5GMM cause value may be utilized by the UDM configured to inform the UE/USIM on an invalidated protection scheme or an invalidated HN PKI. When the UE sends an initial registration request to the UDM, the SUCI is generated. In case the UE lacks the latest update and version of either protection scheme identifier or HN PKI, the SUCI is generated using invalid data. The UDM is able to detect that data in the request is invalid based on bits b5-b8 of the protection scheme identifier; or based on bit b8, or bits b7-b8, of the HN PKI. Instead of processing any further, the UDM is configured to inform the UE on the wrong version. The UDM may use 5GMM cause value "00111111", as added to the list of 5GMM causes, corresponding to "invalid HN public key or protection scheme". FIG. 6 shows, by way of example, a flow chart of a method for registering to a network using a SUCI. The method comprises generating a SUCI at phase 600. The SUCI is generated at a UE, which has returned to the coverage of a communication network. The method may comprise sending a registration request including the generated SUCI at phase 601. The registration request includes a version number of the protection scheme identifier and/or of the HN PKI key used for generating the SUCI. In response to sending the registration request to the communication network, either reject or accept is to be expected from the communication network. If the UE has missed latest OTA updates on upgraded protection scheme identifier or on HN PKIs, the SUCI has been generated using old, invalidated data. The method may further comprise receiving a registration reject including a cause value at phase 602. The cause value may be configured to inform the UE that either invalidated protection scheme identifier or invalidated HN PKI was used for generating the SUCI. The UE is directed to use a default configuration of the protection scheme identifier and/or the HN PKI for generating another SUCI. The UE may receive a default version indication. The UE may perform generating another SUCI based on the default configuration at phase 603. The method may comprise sending a registration request including the another SUCI at phase 604. The method may comprise receiving a registration accepted at phase 605. The registration request including the another SUCI, which is based on the default configuration, is accepted by the communication network. After the registration has been accepted at phase 605, the communication network provides the currently valid, upgraded versions of the protection scheme and/or HN PKI, and the authentication may be accomplished.

The phases of the illustrated method may be performed in device 110, an auxiliary device or a personal computer, for example, or in a control device configured to control the functioning thereof, when installed therein.

Figure 7:
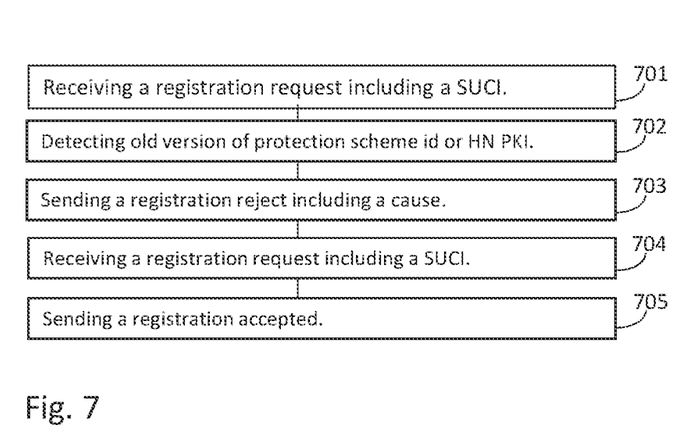
FIG. 7 shows, by way of example, a flow chart of a method for registering to a network using a SUCI.

FIG. 7 shows, by way of example, a flow chart of a method for registering to a network using SUCI. The method comprises receiving a registration request including a SUCI at phase 701. The registration request is received at a communication network, at a UDM. The method comprises detecting old versions of protection scheme identifier or HN PKI at phase 702. The protection scheme identifier and the HN PKI are part of the received SUCI. Old version of the protection scheme identifier is detected via bits b5-b8 of the protection scheme identifier. Old version of the HN PKI is detected via bit b8, or bits b7 and b8, of the HK PKI. In response to detecting an old version, the method comprises sending a registration reject with a cause value at phase 703. The cause value is informative and specifies the reason for the rejection being old, invalid info as detected. The cause value may be part of 5GMM cause list. The method may comprise receiving a new registration request including a SUCI at phase 704. The method may proceed by processing and/or de-concealing the SUCI, after the SUCI is detected to include default configuration of the protection scheme identifier and/or HN PKI. In response to receiving SUCI including the default configuration, the method comprises sending a registration accepted at phase 705. After the registration has been accepted at phase 705, the communication network is configured to provide the upgraded versions of the protection scheme and/or HN PKI, and authentication may be accomplished The previously presented utilization of version indications enables detection of an invalid protection scheme identifier and/or a HN PKI without de-concealment of a received SUCI. This enables an UDM to update keys and protection schemes, and to OTA update the upgraded versions, without storing all the old, previously used or replaced key sets and protection schemes. This is enabled by use of a default configuration, which is supported and maintained as unchanged. A UE, or USIM, avoids repeated trials with old or replaced protection scheme identifiers or HK PKIs, which will not lead to successful authentication. Instead, the UE is informed of the wrong version and is able to use the default configuration. The previously presented aspects, embodiments and examples enable utilizing and/or taking into use existing parameters and variables. An existing list and specifications are used for newly a introduced 5GMM cause value. The presented aspects, embodiments and examples enable to manage expired or multiple protection schemes and home network keys that are used for SUCI calculation.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed As used herein, a plurality of items, structural elements, compositional elements, and/or entities may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, entities, etc. In other instances, well-known structures, parts, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

At least some embodiments of the present invention find industrial application in communication networks.

The invention claimed is:

1. An apparatus comprising: at least one processor; and at least one memory storing instructions that, when executed by the at least one processor, cause the apparatus at least to:
   generate a subscription concealed identifier, SUCI, comprising a protection scheme identifier and a home network public key identifier;
   wherein at least one of the following: a part of the protection scheme identifier or a part of the home network public key identifier comprises a version indication of at least one of the following: the protection scheme identifier or the home network public key identifier;
   generate the SUCI based on a default version indication and a default configuration of at least one of the following: the protection scheme identifier or the home network key identifier, in response to a received registration reject including the default version indication; and
   wherein the default configuration corresponds to a lowest priority or highest index of at least one of: the protection scheme identifier and the home network public key identifier.

2. The apparatus according to the claim 1,
   wherein the registration reject comprises a 5G mobility management cause value; or
   wherein the registration reject comprises a cause value configured to indicate a reason for the received registration reject, wherein the reason refers to at least one of the following: an invalidated or old version of the protection scheme identifier for the home network public key identifier.

3. The apparatus according to claim 1, wherein the default version corresponds to the lowest priority or highest index of at least one of: the protection scheme identifier and the home network public key identifier.

4. The apparatus according to claim 1, wherein the at least one processor; and at least one memory storing instructions that, when executed by the at least one processor, further cause the apparatus at least to receive via over the air update, at least one of the following: an upgraded protection scheme identifier or an upgraded home network public key identifier including, at least one of the following: an upgraded version indication of the upgraded protection scheme identifier or of the upgraded home network public key identifier.

5. A method comprising:
generating a subscription concealed identifier, SUCI, wherein the SUCI comprises a protection scheme identifier and a home network public key identifier;
wherein at least one of the following: a part of the protection scheme identifier or a part of the home network public key identifier comprises a version indication of at least one of the following: the protection scheme identifier or the home network public key identifier;
receiving a registration reject including a default version indication of at least one of the following: the protection scheme identifier or the home network public key identifier;
generating the SUCI based on the default version indication and a default configuration, in response to receiving the registration reject; and
wherein the default version corresponds to the lowest priority or highest index of at least one of: the protection scheme identifier and the home network public key identifier.

6. The method according to the claim 5, wherein the registration reject comprises a cause value, optionally a 5G mobility management cause value; or
wherein the registration reject comprises at least one of the following: a cause value, which is configured to indicate a reason for receiving the registration reject as at least one of the following: invalidated or old version of a protection scheme identifier or a home network public key identifier.

7. The method according to claim 5, comprising receiving, optionally via over the air update at least one of the following: an upgraded protection scheme identifier or an updated home network public key identifier including the upgraded version indication at least one of the following: the upgraded protection scheme identifier or of the home network public key identifier.

8. A non-transitory computer readable medium comprising program instructions that, when executed by an apparatus, cause the apparatus to perform at least the following:
generate a subscription concealed identifier, SUCI, wherein the SUCI comprises a protection scheme identifier and a home network public key identifier, and wherein at least one of the following: a part of the protection scheme identifier or a part of the home network public key identifier comprises a version indication of the same;
generate the SUCI based on a default version indication and a default configuration of at least one of the following: the protection scheme identifier or the home network key identifier, in response to a received registration reject including the default version indication; and
wherein the default configuration corresponds to a lowest priority or highest index of at least one of: the protection scheme identifier and the home network public key identifier.

9. An apparatus comprising: at least one processor; and at least one memory storing instructions that, when executed by the at least one processor, cause the apparatus at least to:
receive a registration request including a subscription concealed identifier, SUCI, wherein the SUCI comprises a protection scheme identifier and a home network public key identifier, and wherein at least one of following: a part of the protection scheme identifier and a part of the home network public key identifier comprises a version indication of at least one of the following: the protection scheme identifier and the home network public key identifier;
detect the version indication from the SUCI received with the registration request;
detect the SUCI including a default version indication and a default configuration of at least one of the following: the protection scheme identifier or the home network public key identifier; and
send a registration accept in response to detecting the SUCI including the default configuration,
wherein the default configuration corresponds to a lowest priority or highest index of at least one of the following: a protection scheme identifier or a home network public key identifier.

10. The apparatus according to claim 9, wherein the at least one processor; and at least one memory storing instructions that, when executed by the at least one processor, further cause the apparatus at least to send a registration reject in response to detecting an invalidated version indication, wherein the registration reject comprises a cause value, optionally a 5G mobility management cause value; or wherein the registration reject comprises a cause value, which is configured to indicate at least one of the following: a reason for the registration reject as invalidated, old version of a protection scheme identifier or a home network public key identifier.

11. The apparatus according to claim 9, wherein the at least one processor; and at least one memory storing instructions that, when executed by the at least one processor, further cause the apparatus at least one of the following:
to send, optionally via over the air update, an upgraded protection scheme identifier or an upgraded home network public key identifier including an upgraded version indication.

* * * * *